US005534364A

United States Patent [19]
Watanabe et al.

[11] Patent Number: 5,534,364
[45] Date of Patent: Jul. 9, 1996

[54] BATTERY BOX DEVICE FOR ELECTRIC VEHICLE

[75] Inventors: Satoshi Watanabe, Utsunomiya; Hitoshi Nakayama, Kawaguchi, both of Japan

[73] Assignee: Honda Giken Kogyo Kabushiki Kaisha, Tokyo, Japan

[21] Appl. No.: 235,063

[22] Filed: Apr. 29, 1994

[30] Foreign Application Priority Data

Apr. 30, 1993 [JP] Japan ................................. 5-104035
Dec. 20, 1993 [JP] Japan ................................. 5-319837

[51] Int. Cl.$^6$ .............................. H01M 2/10; B60K 1/00
[52] U.S. Cl. .................... 429/61; 429/97; 429/99; 429/100; 429/150; 180/65.3; 180/65.8
[58] Field of Search ........................... 429/7, 97, 61, 429/150, 99; 307/9.1, 10.1; 180/65.1, 65.8, 65.8, 65.3

[56] References Cited

U.S. PATENT DOCUMENTS 4,500,820  2/1985  Noto ........................................ 318/139
5,389,824  2/1995  Moroto ................................... 307/10.1
5,392,873  2/1995  Masuyama ............................. 180/68.5

FOREIGN PATENT DOCUMENTS 57-4063  1/1982  Japan .

*Primary Examiner*—John Niebling
*Assistant Examiner*—Brendan Mee
*Attorney, Agent, or Firm*—Lyon & Lyon

[57] ABSTRACT

A battery box device for use on an electric vehicle includes a drive power supply having a plurality of storage batteries for supplying the electric energy to drive the electric vehicle, a circuit breaker device having a controller for producing a power supply control signal based on conditions of the electric vehicle, and a circuit breaker for turning off the drive power supply in response to the control signal from the controller. A battery box housing at least the storage batteries and the circuit breaker device. The battery box device also has a breaker box housing at least the controller and the circuit breaker device with the storage batteries and the circuit breaker device being separate from each other. A circuit breaker switch is operable from outside of the battery box.

37 Claims, 6 Drawing Sheets

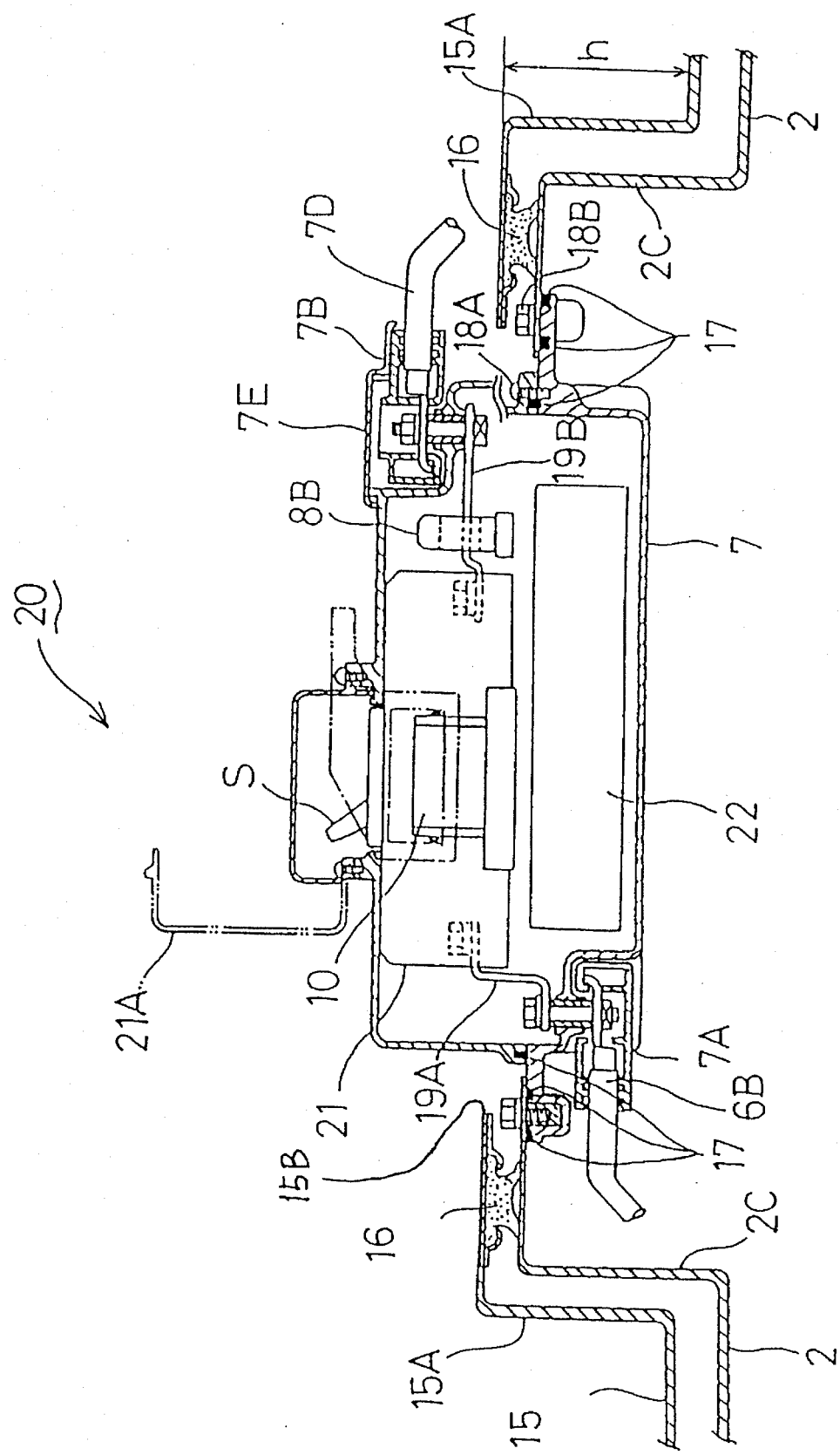

BATTERY BOX DEVICE FOR ELECTRIC VEHICLE

BACKGROUND OF THE INVENTION

1. Field of the Invention

The present invention relates to a battery box device for use as a vehicle power supply for driving an electric vehicle or the like.

2. Description of the Prior Art

As disclosed in Japanese patent publication No. 57-4063, one conventional battery box device for use on an electric vehicle has a switch device disposed in a battery circuit in a battery case and having a normally open contact for cutting off the output of electric energy supplied from a battery to an external load such as a motor which drives the electric vehicle. When the battery box device is installed on the electric vehicle, an operable member which is slidable in one direction into other switch device is pressed to slide in the opposite direction by a side wall of the vehicle body, thus closing the contact of the switch device for allowing the output electric energy to be supplied from the battery to the external load.

When the battery box device is dismounted from the electric device, the contact of the switch device is opened to prohibit the output of the electric energy supplied from the battery. Therefore, the battery box device can be assembled, inspected, or serviced while preventing a short circuit, a current leak, or other faults from occurring.

Since the switch device of the conventional battery box device has only an ON/OFF switch for prohibiting the output of the electric energy from the battery, various other circuits including, for example, a circuit breaker for manually cutting off the output of electric energy supplied from the battery, and a controller for controlling the circuit breaker according to control information based on signals from various sensors which detect various conditions of the electric vehicle have to be installed on the electric vehicle and wired in advance. However, the process of installing and wiring those circuits in a small vehicle cabin is quite tedious and time-consuming.

Checking the circuit breaker and the controller for their functions and performance is also tedious and time-consuming because the functions and performance are required to be finally confirmed after the battery has been installed on the Vehicle body.

SUMMARY OF THE INVENTION

It is, therefore, an object of the present invention to provide a battery box device which comprises a drive power supply composed of a plurality of storage batteries, and a circuit breaker device composed of a circuit breaker for cutting off the output of electric energy supplied from the drive power supply for driving an electric vehicle and a controller for controlling the circuit breaker, the drive power supply and the circuit breaker device being integrally combined with each other by a single battery box, so that the battery box device can efficiently be assembled, installed, inspected, and serviced for maintenance.

According to the present invention, there is provided a battery box device for use on an electric vehicle, comprising a drive power supply composed of a plurality of storage batteries for supplying an electric energy to drive the electric vehicle, a circuit breaker device having control means for producing a power supply control signal based on conditions of the electric vehicle, a circuit breaker for turning off the drive power supply in response to the control signal from the control means, and a battery box housing at least the storage batteries, the circuit breaker device being integrally combined with the battery box.

The battery box device may further comprise a breaker box housing at least the control means and the circuit breaker, the storage batteries and the circuit breaker device being separate from each other and integral with the battery box, and an accessible member operable from outside of the battery box, the accessible member being disposed outside of the battery box.

The accessible member may comprise a manual breaker switch for selectively connecting and disconnecting the drive power supply, an output connector connectable to an external load, and an interface connector for exchanging signals therethrough between the battery box device and a vehicle control unit on the electric vehicle. When the battery box device is installed on the electric vehicle, at least one of the breaker switch, the output connector, and the interface connector is preferably exposed in a passenger's compartment of the electric vehicle for being operated in the passenger's compartment. The battery box device may preferably further comprise sealing means for sealing the at least one of the breaker switch, the output connector, and the interface connector from outside of the electric vehicle when the battery box device is installed on the electric vehicle.

Since the circuit breaker device is integrally combined with the battery box, the battery box device alone can be checked for storage battery voltage and circuit breaker operation, confirmed for its performance, and serviced for maintenance.

The circuit breaker and the control means are housed in the breaker box, and the circuit breaker device and the storage batteries are separate from each other and integrally combined with the battery box. Consequently, after the circuit breaker device has been assembled and confirmed for its operation and the storage batteries have been assembled and checked for their voltages, the overall battery box device can be assembled and confirmed for its operation.

With the circuit breaker device being integrally incorporated in the battery box device, the breaker switch, the output connector, and the interface connector are disposed outside of the battery box. Accordingly, it is possible to connect a dummy load, a dummy vehicle control unit, an actual load, or an actual vehicle control unit to the output connector and the interface connector, or to manually operate the breaker switch, for assembling the battery box device and confirming its operation.

When the battery box device is installed on the electric vehicle, the breaker switch, the output connector, and the interface connector are disposed in the passenger's compartment of the electric vehicle for easy connection (assembly), operation check, and servicing.

The sealing means is effective in hermetically sealing the circuit breaker device, particularly the breaker switch, the output connector, and the interface connector thereof, in the passenger's compartment from outside of the electric vehicle, for thereby preventing external water and dust particles from entering the passenger's compartment through the circuit breaker device.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is a vertical cross-sectional view of a portion of a battery box device according to another embodiment of the present invention;

DETAILED DESCRIPTION OF THE PREFERRED EMBODIMENTS

Figure 1:
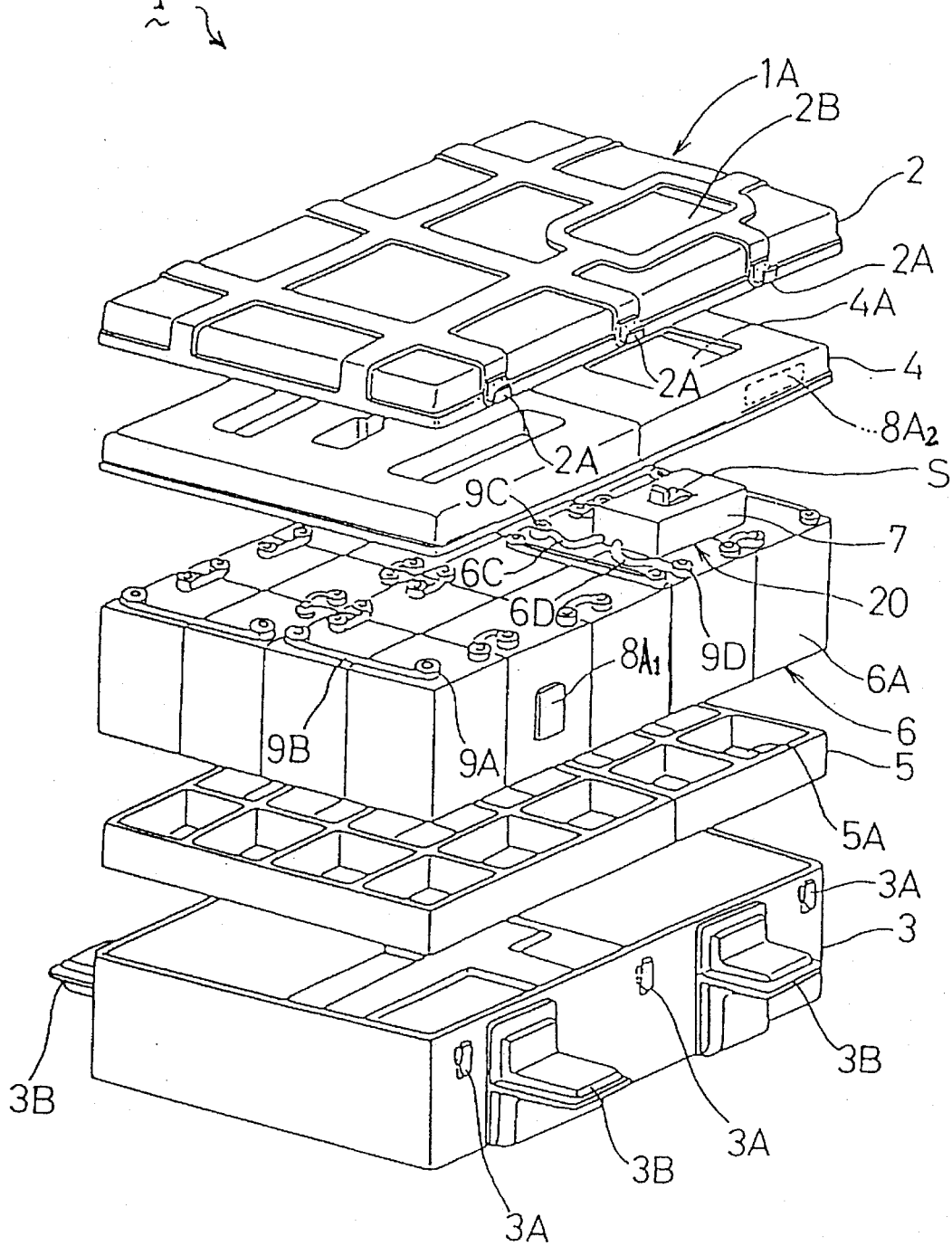
FIG. 1 is an exploded perspective view of a battery box device for use on an electric vehicle according to an embodiment of the present invention.
Figure 5:
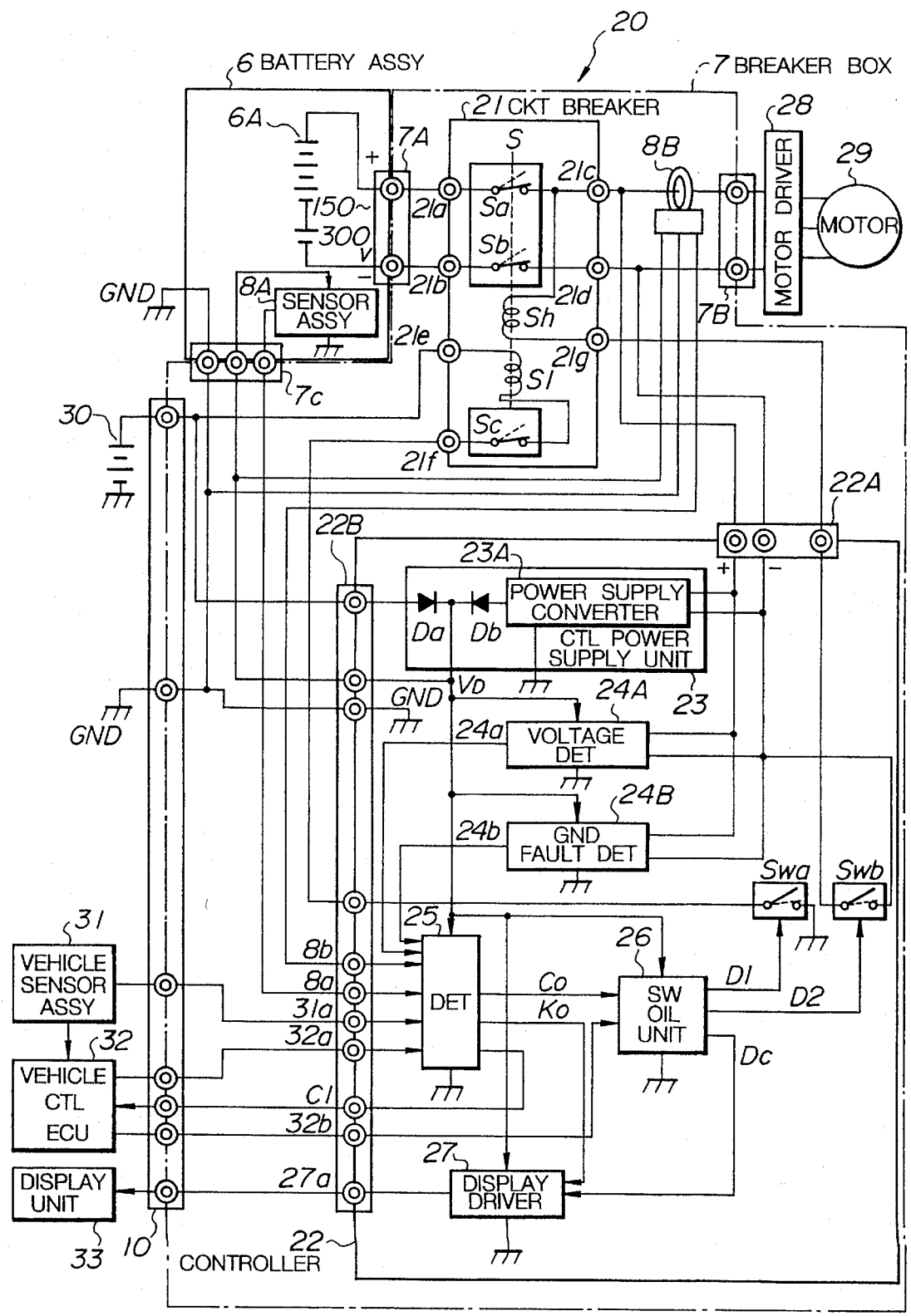
FIG. 5 is a block diagram of the circuit breaker device.

As shown in FIG. 1, a battery box device 1 for use on an electric vehicle according to the present invention includes a circuit breaker device 20 having a breaker box 7 which houses, as shown in FIG. 5 a circuit breaker 21, a controller 22, a current sensor 8B, an input connector 7A, an output connector 7B, an input connector 7C, and an external interface (I/F) connector 10. The battery box device 1 also includes a battery assembly 6 having a high-voltage drive power supply 6A as a battery composed of a plurality of series-connected storage batteries and a sensor assembly 8A. The circuit breaker device 20 and the battery assembly 6 are separate from each other as different functional blocks, but are substantially integrated by or housed in a battery box 1A.

The battery box 1A comprises a pair of upper and lower cases 2, 3 of steel and a pair of upper and lower battery covers 4, 5 of synthetic resin. The sensor assembly 8A comprises a plurality of sensors including a sensor $8A_1$ for detecting the temperature of the drive power supply 6A and a gas sensor $8A_2$ for detecting hydrogen gas.

Figure 2A:
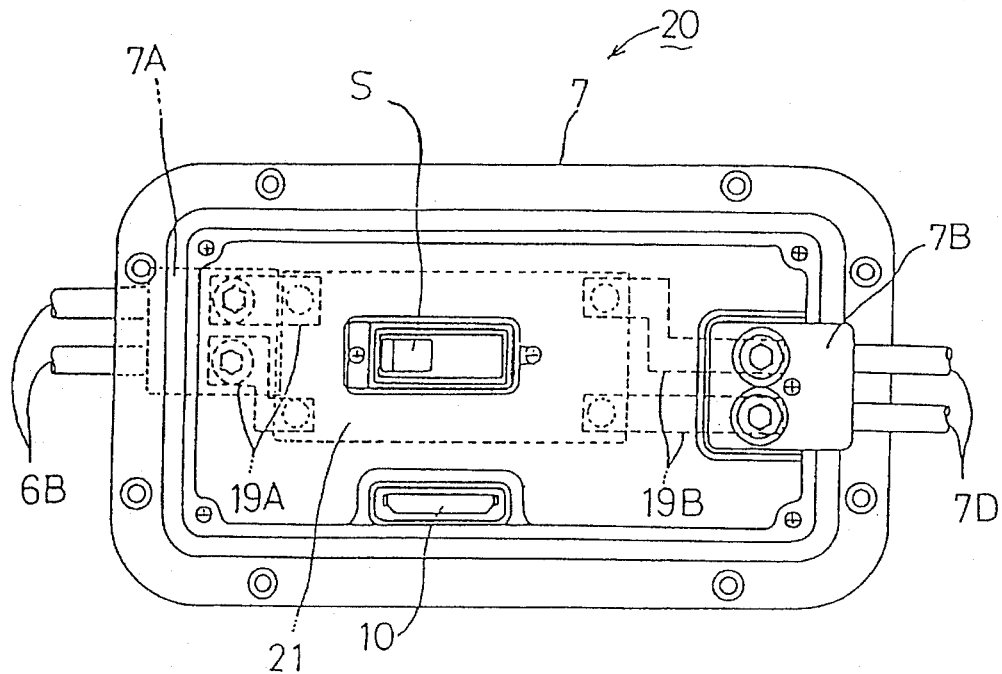
FIG. 2(a) is a plan view of a circuit breaker device in the battery box device.
Figure 2B:
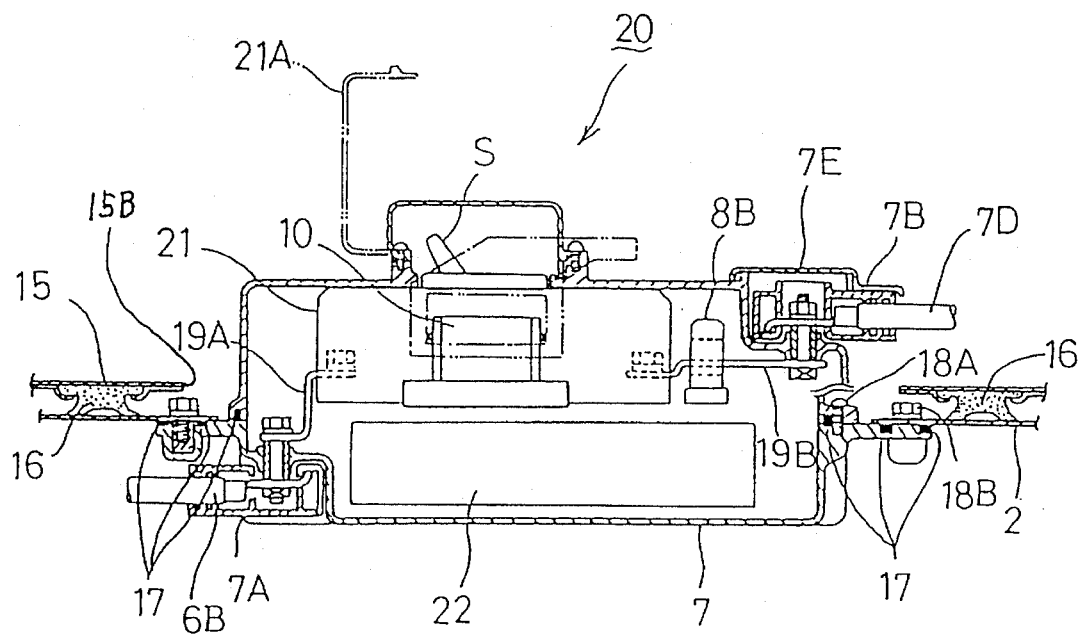
FIG. 2(b) is a vertical cross-sectional view of the circuit breaker device shown in FIG. 2(a)
Figure 3A:
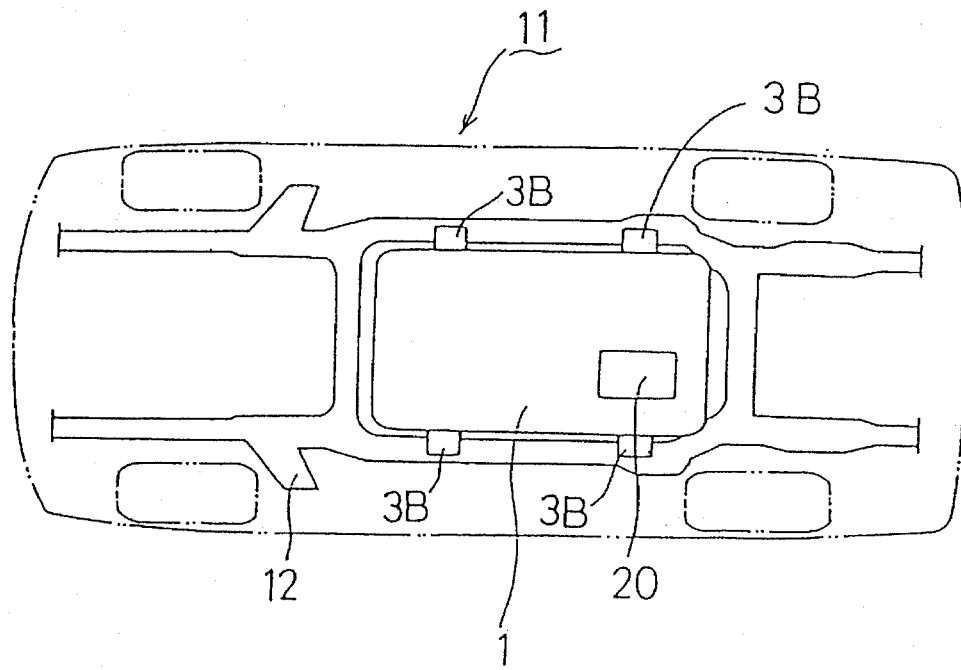
FIG. 3(a) is a schematic plan view of an electric vehicle which incorporates the battery box device according to the present invention.
Figure 3B:
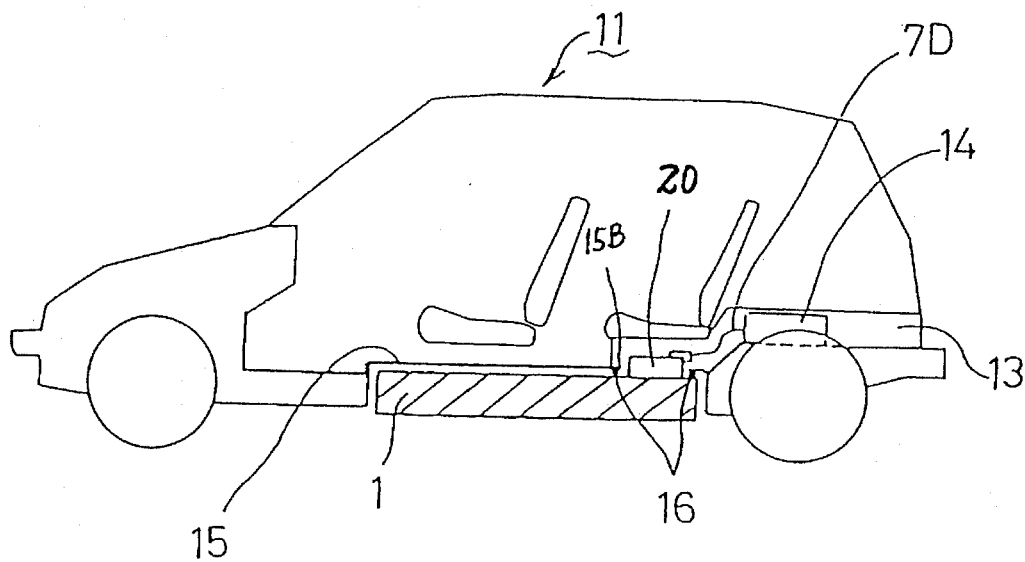
FIG. 3(b) is a side elevational view of the electric vehicle shown in FIG. 3(a)

In use, the battery box device 1 with the battery assembly 6 housed in the battery box 1A and with the circuit breaker device 20 partly housed in the battery box 1A or integrally coupled to the battery assembly 6 is fixedly mounted on the bottom panel 15 (see FIG. 3(b)) of the vehicle body of an electric vehicle 11. Therefore, the battery box device 1 is required to be protected against vibrations of the electric vehicle and water splashes from the road. To meet such requirements, the battery box device 1 is constructed for sufficient mechanical strength and is a hermetically sealed structure. For example, the upper case 2 has a plurality of hooks 2A on its outer side edges, and the lower case 3 has a plurality of locks 3A on its outer side panels in alignment with the hooks 2A, respectively. These hooks 2A and locks 3A are releasably coupled to each other to fix the upper and lower cases 2, 3 together in alignment with each other, thus making up the battery box 1A. As shown in FIG. 2(b), the circuit breaker device 20 is fixedly joined to the battery box 1A by screws 18B which interconnect the breaker box 7 and the upper case 2.

The upper case 2 has an open window 2B defined therein. The circuit breaker device 20 may be disposed partly or entirely out of the upper case 2 through the open case window 2B, or preferably projects out of the upper case 2 through the open case window 2B, so that a breaker switch S of the circuit breaker device 20 can manually be operated and connectors or terminals of the circuit breaker device 20 can be connected to an outer circuit or the like after the battery box device 1 has been assembled or installed on the bottom panel 15 of the electric vehicle body. At least the breaker switch S and some of the connectors or terminals are exposed to the outside of the breaker box 7 as shown in FIGS. 1, 2(a), and 2(b). Preferably, the breaker switch S projects from an upper surface of the breaker box 7, and some of the connectors or terminals are exposed to the outside of the upper surface of the breaker box 7.

The lower case 3 has a plurality of (four in the illustrated embodiment) attachment arms 3B on its outer side panels. For installation, the battery box device 1 is positioned immediately below the bottom panel 15 (see FIG. 3(b)) of the electric vehicle body, and fixedly supported on a frame 12 (see FIG. 3(a)) of the electric vehicle body by the attachment arms 3B.

The upper and lower battery covers 4, 5 of the battery box 1A cooperate with the upper and lower cases 2, 3 in vertically accommodating and supporting the drive power supply 6A, the sensor assembly 8A, and the circuit breaker device 20, and protecting them by absorbing vibrations of the electric vehicle.

The lower cover 5 has a plurality of battery storage chambers or compartments 5A for housing the respective storage batteries therein. The cell storage chambers 5A allow the storage batteries to be easily positioned therein and interconnected by cables. In addition, the battery storage chambers 5A permit the storage batteries to be simultaneously and neatly placed in the battery box 1A while leaving spaces around the respective storage batteries for dissipating the heat produced by the storage batteries.

The upper cover 4 has an open cover window 4A defined therein in registry with the open case window 2B so that the circuit breaker device 20 can project partly or entirely through the open case window 2B. The sensor 8A2, for example, of the sensor assembly 8A is mounted in the upper cover 4 for monitoring any hydrogen gas which may be generated when the drive power supply 6A is overcharged. The sensor assembly 8A and the circuit breaker device 20 are electrically connected to each other, as shown in FIG. 5, for supplying sensor signals from the sensor assembly 8A to the circuit breaker device 20.

The drive power supply 6A comprises a plurality of chargeable lead storage batteries, for example, which are connected in series with each other by connector cables 9B connected to terminals 9A of the storage batteries. The drive power supply 6A with the storage batteries thus connected produce any desired output voltage preferably ranging from 150 V to 300 V, for example. The storage batteries at the opposite ends of the series-connected array of storage batteries having end terminals 9C, 9D, respectively, which are connected to the circuit breaker device 20 through respective connector cables 6C, 6D for thereby supplying the battery output voltage to the circuit breaker device 20. Specifically, as shown in FIGS. 2(a) and 2(b), the connector cables 6C, 6D are connected as input cables 6B to the input connector 7A of the circuit breaker device 20.

The temperature sensor $8A_1$, for example, of the sensor assembly 8A is mounted on the drive power supply 6A for detecting the temperature of the storage batteries. Detected signals from the temperature sensor $8A^1$ and the gas sensor 8A₂ are supplied through the input connector 7C (see FIG. 5) to the circuit breaker device 20.

The voltage of the drive power supply 6A alone can be checked through the connector cables 6C, 6D or the input connector 7A after the battery assembly 6 has been assembled and wired.

As described above, the circuit breaker device 20 which comprises the circuit breaker 21, the controller 22, and the other components constitutes a functional block, and is disposed in an upper portion of the battery box device 1 with the manual breaker switch S on its upper surface. In particular, the circuit breaker device 20 projects partly or entirely from the case window 2B so as to be positioned substantially outside of the upper case 2.

The present invention is, however, not limited to the above embodiment with respect to the integral arrangement of the battery box 1A and the circuit breaker device 20. The circuit breaker device 20 may first be electrically connected to the drive power supply 6A housed in the battery box 1A, and then the breaker box 7 may be mechanically coupled to the battery box 1A in the case window 2B. The case window 2B may be defined as an insertion hole for inserting the input cables 6B, and the breaker box 7 may be placed on the upper surface of the battery box 1A.

When the circuit breaker device 20 is turned on by manually operating the breaker switch S, the battery box device 1 can supply an electric energy generated by the drive power supply 6A to an external load such as a motor driver 28 as shown in FIG. 5. When the circuit breaker device 20 is turned off by manually operating the breaker switch S, the battery box device 1 can shut-off the outputting of the electric energy, so that the battery box device 1 can easily be handled when it is installed on the electric vehicle or serviced for maintenance.

As shown in FIGS. 2(a) and 2(b), the circuit breaker 21, the controller 22, the current sensor 8B, the input connector 7A, the output connector 7B, and the I/F connector 10 are housed in the breaker box 7, and the manual breaker switch S projecting upwardly from the breaker box 7 is openably covered with a switch protection cover 21A hinged to the breaker box 7. The output connector 7B is positioned in an upper portion of the circuit breaker device 20, and the input connector 7A is positioned in a lower portion of the circuit breaker device 20. The input cables 6B from the drive power supply 6A are connected to the input connector 7A, and output cables 7D from an external load, e.g., the motor driver 28 shown in FIG. 5, are connected to the output connector 7B.

The output voltage which may range from 150 V to 300 V) from the drive power supply 6A is supplied through the input cables 6B, the input connector 7A, and an input bus bar 19A to the circuit breaker 21, from which it is supplied through an output bus bar 19B, the output connector 7B, and the output cables 7D to the motor driver 28. The current sensor 8B for monitoring an output current of the circuit breaker 21 is attached to the output bus bar 19B. When an excessive current flows through the output bus bar 19B, it is detected by the current sensor 8B, and the controller 22 operates the circuit breaker 21 to turn-off the drive power supply 6A.

In this embodiment, the input cables 6B from the drive power supply 6A and the input connector 7A are connected to each other at the time when the battery box device 1 is assembled, and cannot be accessed from the exterior after assembled. However, the present invention is not limited to such a structure.

The I/F connector 10, which is accessible from the exterior, is mounted and exposed on an upper portion of the breaker box 7 for easy connection to a dummy circuit (not shown) for operating the circuit breaker 21 or an external maintenance test device (not shown) for diagnosing the circuit breaker 21, so that the circuit breaker device 20 can be checked alone. The I/V connector 10 also allows the circuit breaker device 20 to be easily connected to functional blocks on the electric vehicle, e.g., a vehicle control electronic control unit (ECU) 32, a vehicle sensor assembly 341, a display unit 33, and an accessory power supply 30 for supplying a voltage of 12 V, as shown in FIG. 5.

The input connector 7A and the output connector 7B shown in FIGS. 2(a) and 2(b) are disposed and exposed out of the breaker box 7. The input cables 6B (6C, 6D) for carrying the electric power from the driver power supply 6A are connected to the input connector 7A, and the output cables 7D from the motor driver 28 for energizing a motor 29 see FIG. 5) on the electric motor are connected to the output connector 7B. the output connector 7B is covered with a protective connector cover 7E.

Since the circuit breaker device 20 is electrically connected to the batteries and the external circuits through the connectors 7A, 7B, 7C, the circuit breaker device 20 can efficiently be assembled and serviced.

The breaker switch S and the connector cover 7E may be interlinked by a link mechanism or the like (not shown) such that the output connector 7B can be covered with the connector cover 7E when the breaker switch S is turned on, and the connector cover 7E can be moved to open the output connector 7B only when the breaker switch S is turned off, i.e., when the drive power supply 6A is cut-off. With such modified arrangement, the drive power supply 6A is cut-off for safe operation insofar as the connector cover 7E is removed for connecting the output cables 7D to the output connector 7B and serving the output connector 7B.

The switch protection cover 21A is positioned so as to project out of the upper case 2 through the cover window 4A and the case window 2B/. Consequently, the switch protection cover 21A can manually be opened from outside of the upper case 2, and the breaker switch S can manually be operated. When the switch protection cover 21A is opened and the breaker switch S is turned on, therefore, the battery box device 1 alone can be operated and checked for its performance.

When the breaker switch S is turned off and the switch protection cover 21A is closed, the drive power supply 6A is turned off. In this manner, the drive power supply 6A can remain turned off while the battery box device 1 is being installed on the electric vehicle or dismounted for maintenance.

As shown in FIG. 2(b), the breaker box 7 has upper and lower mating surfaces fastened to each other by screws 18A. The screws 18A, 18B are tightened on the breaker box 7 and the upper case 2 through seal gaskets 17 which make the circuit breaker device 20 and the battery box device 1 hermetically sealed.

The functional blocks of the battery box device 1, i.e., the circuit breaker device 20 and the battery assembly 6, are housed in or integrated by the battery box 1A. Consequently, the battery box device 1 is of a relatively simple construction with only the breaker switch S, the output connector 7B, and the I/F connector 10 being exposed outside of the breaker box 7.

Inasmuch as the breaker switch S, the output connector 7B, and the I/F connector 10 are disposed outside or upwardly of the upper case 2 and the bottom panel 15 of the vehicle body, the breaker switch S can easily be operated and the output connector 7B and the I/F connector 10 can easily be connected to and disconnect from external connectors.

When the battery box device 1 is installed on the electric vehicle, the breaker switch S, the output connector 7B, and the I/F connector 10 are located within a passenger's compartment of the electric vehicle. Consequently, after the battery box device 1 has been installed on the electric vehicle, the breaker switch S can be operated and the output connector 7B and the I/F connector 10 can be connected within the passenger's compartment, and the breaker switch S, the output connector 7B, and the I/F connector 10 can be serviced for maintenance within the passenger's compartment.

A dummy power supply or load, or a simple test instrument may be connected to the breaker switch S, the input connector 7A, the output connector 7B, and the I/F connector 10 for checking the circuit breaker device 20 for its operation and confirming its performance. Therefore, before the circuit breaker device 20 is assembled in the battery box device 1, the circuit breaker device 20 alone may be checked and guaranteed for performance.

The battery box device 1 is installed on an electric vehicle 11 as shown in FIGS. 3(a) and 3(b), the battery box device 1 is mounted on the bottom panel 15 of the electric vehicle 11.

In FIGS. 3(a) and 3(b), the battery box device 1 is shown as being fixedly mounted on the frame 12 on the bottom panel 15 of the electric vehicle 11 through the attachment arms 3B of the lower case 3.

With the battery box device 1 installed on the electric vehicle 11, the circuit breaker device 20 which projects upwardly out of the battery box 1A through the case window 2B also projects upwardly into the passenger's compartment of the electric vehicle 11 through an opening 15B that is defined in the bottom panel 15, as shown in FIGS. 2(b) and 3(b).

In FIG. 3(b), the battery box device 1 is shown as being positioned underneath the front and rear seats in the electric vehicle 11 with the circuit breaker positioned beneath the rear seat. Since the circuit breaker device 20 projects upwardly into the passenger's compartment, the breaker switch S and the I/F connector 10 are exposed in the passenger's compartment. Therefore, the breaker switch S can be operated in the passenger's compartment to actuate the circuit breaker 21. The circuit breaker device 20 may project into the passenger's compartment underneath the front seats in the electric vehicle 11, or anywhere in the passenger's compartment depending on the location of the load, i.e., the motor 29.

Since the I/F connector 10 is also exposed in the passenger's compartment, the vehicle sensor assembly 31, the vehicle control ECU 32, the display unit 33, and the accessory power supply 30 can be connected to the circuit breaker device 20 in the passenger's compartment.

The battery box device 1 is attached to the bottom panel 15 through a water-resistant seal 16 (see FIGS. 2(b) and 3(b)) which is sealingly interposed between the upper case 2 and the bottom panel 15 and extends around the opening 15B. Therefore, any water or dust particles are prevented from entering through the opening 15B into the passenger's compartment.

The input cables 6B and the input connector 7A are sealed in the battery box device 1, and connected to the circuit breaker device 20 underneath the bottom panel 15. The output connector 7B and the output cables 7D are positioned above the bottom panel 15, and sealed from the exterior by the water-resistant seal 16.

FIG. 4 shows a battery box device according to another embodiment of the present invention.

The battery box device shown in FIG. 4 differs from the battery box device shown in FIG. 2(b) in that the circuit breaker device 20 is fixedly mounted on an upwardly projecting mount 2C of the upper case 2, the output cables 7D from the circuit breaker device 20 are bent downwardly from the output connector 7B toward the bottom panel 15, and the bottom panel 15 of the electric vehicle has an upwardly projecting base 15A in which the upwardly projecting mount 2C is complementarily housed. The other details of the battery box device shown in FIGS. 4 are the same as those of the battery box device shown in FIGS. 2(b).

The battery box device shown in FIG. 4 offers the following advantages:

Since the output cables 7D are bent downwardly, any water flowing along the output cables 7D is prevented from entering the output connector 7B.

The breaker switch S, the output connector 7B, and the I/F connector 10 of the circuit breaker device 20 are higher than the bottom panel 15 by a distance of at least h. Therefore, even when water enters through the bottom panel 15 into the passenger's compartment past the water-resistance seal 16 and the seal gaskets 17 for some reason, the water is prevented from being applied to the breaker switch S, the output connector 7B, and the I/F connector 10.

Now, an electric circuit arrangement of the circuit breaker device 20 will be described below.

FIG. 5 shows in block form the electric circuit arrangement of the circuit breaker device 20. As shown in FIG. 5, the circuit breaker device 20 includes the circuit breaker 21 with the manual breaker switch S, the controller 22, and the current sensor 8B which are disposed in the breaker box 7, and also has the input connector 7A, the output connector 7B, the input connector 7C, and the I/F connector 10 which are mounted on outer panel surfaces of the breaker box 7. These connectors are electrically connected to the circuit breaker 21 with the manual breaker switch S, the controller 22, and the current sensor 8B as shown.

In FIG. 5, the battery assembly 6 includes the drive power supply 6A which generates a high voltage ranging from 150 V to 300 V for energizing the motor 29 and which is electrically connected to the circuit breaker device 20 through the input connector 7A, and the sensor assembly 8A which is electrically connected to the circuit breaker device 20 through the input connector 7C.

The battery assembly 6 and the circuit breaker device 20 are integrally coupled to each other into the battery box device 1. The drive power supply 6A can be charged and the circuit breaker 21 can be checked for its operation and serviced for maintenance while mounted in the battery box device 1.

The motor driver 28 is electrically connected to the circuit breaker device 20 through the output connector 7B and terminals 21c, 21d, for energizing the motor 29 with the high voltage supplied from the driver power supply 6A through the output connector 7B. The accessory power supply 30, the vehicle sensor assembly 31, the vehicle control ECU 32, the display unit 33 are electrically connected to the circuit breaker device 20 through the I/F connector 10. The electrical ground of the electric vehicle 11 is connected to the electrical ground of the circuit breaker device 20 also through the I/F connector 10, as shown by the electrical ground symbols (unnumbered).

The accessory power supply 30 also comprises one or a plurality of chargeable storage batteries, and serves as a low-voltage power supply for energizing accessories and head lamps on the electric vehicle, and also a supply of electric energy to the circuit breaker device 20 to energize the controller 22 and the circuit breaker 21.

The drive power supply 6A has two power lines connected through the input connector 7A to terminals 21a, 21b, respectively, of the circuit breaker 21. The drive power supply 6A is removably supported on the electric vehicle body. The sensor assembly 8A has a sensor signal line connected through the input connector 7C to a connector 22B of the controller 22.

The accessory power supply 30 has a negative terminal grounded and a positive terminal connected through the I/F connector 10 to the connector 22B of the controller 22. The accessory power supply 30, which is shown as being external to the battery assembly 6, may be included in the battery assembly 6.

The circuit breaker 21 comprises a shunt coil Sh, a shunt coil S1, a contact Sa, a contact Sb, a contact Sc, and the manual breaker switch S.

Each of the contacts Sa, Sb, Sc comprises a normally closed (normally-on) switch. When a current flows through either one of the shunt coils Sh, S1, all of the contacts Sa, Sb, Sc are turned off, turning off the breaker switch S. The contacts Sa, Sb, Sc can also be turned on and off by manually operating the breaker switch S.

The shunt coil Sh has a terminal connected through the contact Sa and the terminal 21a to the positive terminal of the drive power supply 6A, and has the other terminal connected through a terminal 21g and a connector 22A to a switch Swb of the controller 22. The switch Swb is connected through the connector 22A, the terminal 21d, the contact Sb, and the terminal 21b to the negative terminal of the drive power supply 6A.

The shunt coil S1 has a terminal connected through a terminal 21e and the I/F connector 10 to the positive terminal of the accessory power supply 30, and the other terminal connected through the contact Sc, a terminal 21f, and the connector 22B to a grounded switch Swa of the controller 22.

Therefore, when the switch Swb or Swa is turned on to supply a current to either one of the shunt coils Sh, S1, the circuit breaker 21 is actuated to turn off the contacts Sa, Sb, thus cutting off the electric energy from the drive power supply 6A.

The controller 22 comprises a controller power supply unit 23, a voltage detector 24A, a ground-fault detector 24B, a detector 25, a switch control unit 26, the switches Swa, Swb, and a display driver 27.

The control power supply unit 23 comprises a power supply converter 23A and a pair of diodes Da, Db. The control power supply unit 23 supplies either an electric energy having a voltage of 12 V which has been converted from the electric energy supplied from the drive power supply 6A through the connector 22A, or the electric energy having a voltage of 12 V supplied from the accessory power supply 30 through the connector 22B, as a control voltage $V_D$ of 12 V, to the voltage detector 24A, the ground fault detector 24B, the detector 25, the switch control unit 26, the display driver 27, and the sensor assembly 8A.

The power supply converter 23A is composed of an electronic device such as a DC/DC converters or the like for lowering a DC voltage, i.e., the voltage (150 V~300 V) of the driver power supply 6A to the control voltage $V_D$ (12 V), which is supplied through the diode Db.

Since the power supply converter 23A is contained in the controller 22 to minimize the wiring of the high-voltage power supply system, it can be assembled and serviced highly efficiently, and can also be constructed of a relatively few number of parts.

The voltage from the accessory power supply 30 is supplied as the control voltage $V_D$ through the diode Da.

When the voltage supplied from the accessory power supply 30 through the diode Da drops from 12 V to a level below a predetermined value, the power supply converter 23A is energized regardless of whether the electric vehicle is running or at rest, thus supplying the control voltage $V_D$ through the diode Db.

When the voltage supplied from the accessory power supply 30 through the diode Da remains in an acceptable predetermined range, the power supply converter 23A is disabled into a standby condition. Therefore, the power supply converter 23A can have a longer service life and consume a reduced amount of electric energy.

The diodes Da, Db are connected in reverse with each other for preventing a current from flowing back to the power supply converter 23A and the accessory power supply 30.

The voltage detector 24A and the ground-fault detector 24B are energized by the control voltage $V_D$ for monitoring the voltage supplied from the drive power supply 6A through the connector 22A. When the voltage detector 24A or the ground-fault detector 24B detect an abnormal voltage or a ground fault, respectively, of the drive power supply 6A, they transmit respective detected signals to the detector 25. More specifically, the voltage detector 24A, which may comprise a voltage detecting unit, for example, outputs a voltage detected signal when the voltage of the drive power supply 6A becomes higher or lower than a predetermined value. The ground-fault detector 24B, which may comprise an isolated photocoupler or the like, outputs a ground-fault detected signal when the output from the photocoupler drops to a zero level.

The detector 25 is supplied with detected signals 8a from the sensor assembly 8A, a current detected signal 8b from the current sensor 8B, a voltage detected signal 24a from the voltage detector 24A, a ground-fault detected signal 24b from the ground-fault detector 25B, various sensor signals 31a from the vehicle sensor assembly 31, and a test or dummy signal 32a supplied from the vehicle control ECU 32 for confirming the operation of the controller 22, or a composite control signal 32a generated by the vehicle control ECUI 32 based on processing of various sensor signals 31a from the vehicle sensor assembly 31. In response to these supplied signals, the detector 25 generates and supplies a switch control signal Co to the switch control unit 26.

The control signals 32a and a control signal C1 are transmitted between the vehicle control ECU 32 and the detector 25 for monitoring the vehicle control ECU 32 and the detector 25 to determine whether they operate normally or not.

Based on the various sensor signals 31a from the vehicle sensor assembly 31, the detector 25 supplies the control signal C1 to the vehicle control ECU 32, and also supplies a display control signal Ko to the display driver 27 for displaying any malfunction detected by the vehicle sensor assembly 31 on the display unit 33.

In response to the switch control signal Co from the detector 25 and a switch control signal 32b from the vehicle control ECU 32, the switch control unit 26 sends drive signals D1, D2, respectively, to the switches Swa, Swb to turn on the switches Swa, Swb for thereby energizing the shunt coils Sh, S1 to actuate the circuit breaker 21 to turn off the contacts Sa–Sc, thus cutting off the electric energy from the drive power supply 6A. each of the switches Swa, Swb comprises an electronic switch or the like.

The switch control unit 26 also supplies a display control signal Dc corresponding to the switch control signal Co or the switch control signal 32b to the display driver 27.

The display driver 27 generates a display drive signal 27a indicative of information about vehicle conditions stored in a ROM or the like, based on the display control signal Ko from the detector 25 and the display control signal Dc from the switch control until 26. The display driver 27 sends the generated display driver signal 27a to the display unit 33, which may be mounted on a front instrument panel of the electric vehicle, for displaying malfunctions as detected by the sensors assembly 8A, the current sensor 8B, the voltage detector 24A, the ground-fault detector 24B, and the vehicle sensor assembly 31.

Figure 6:
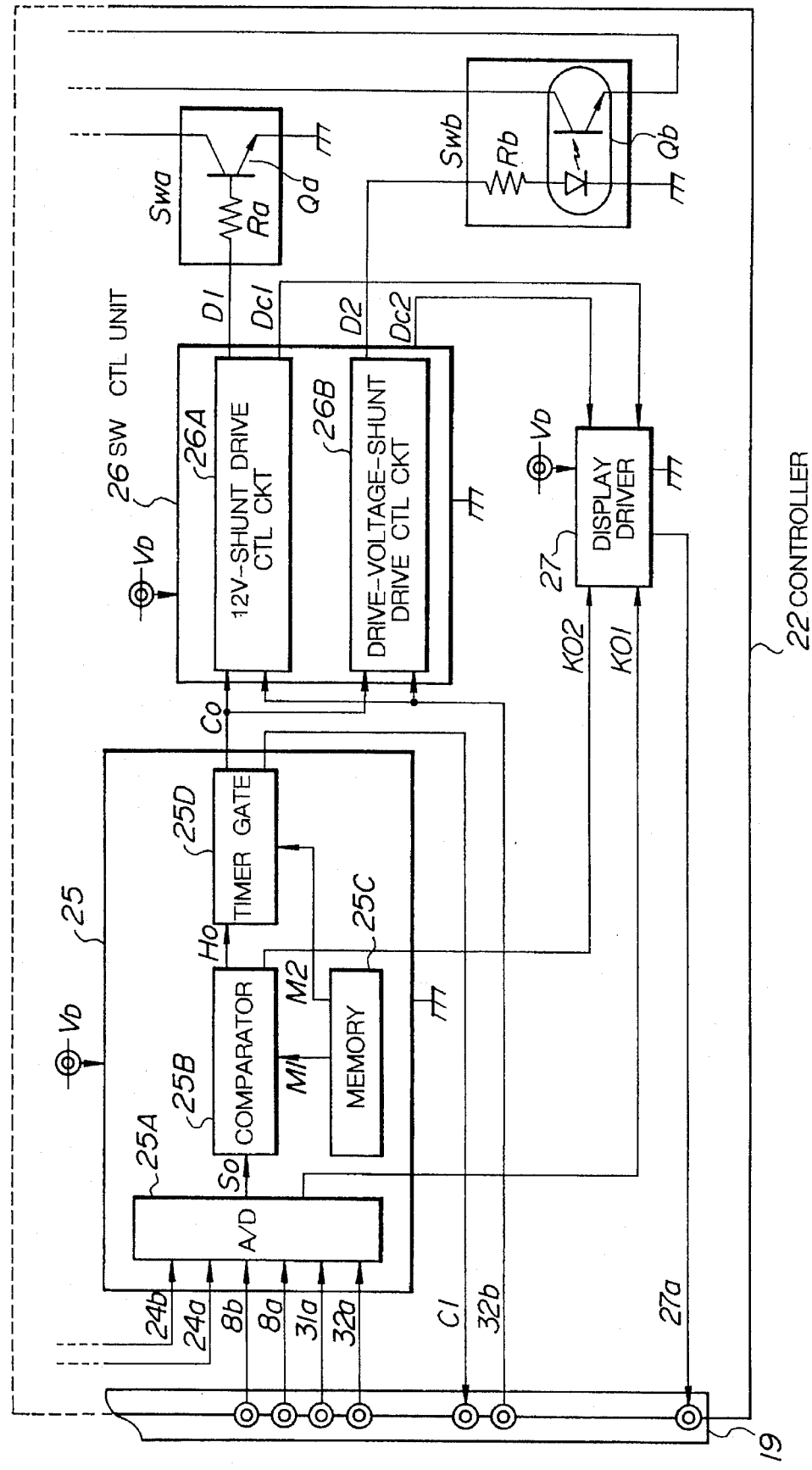
FIG. 6 is a block diagram of a detector and a switch control unit of a controller in the circuit breaker device.

The detector 25 and the switch control unit 26 are shown in greater detail in FIG. 6.

As shown in FIG. 6, the detector 25 comprises an analog-to-digital (A/D) converter 25A for converting each f various analog sensor signals into a digital sensor signal So, a memory 25C such as a ROM or the like for storing a sensor reference value M1 and a timer reference value M2, a comparator 25B for comparing the digital sensor signal So from the A/D converter 25A with the sensor reference value M1 read from the memory 25C and outputting a compared signal Ho, and a timer gate 25D for comparing a continuation time $T_H$ for which the compared signal Ho continues with the timer reference value M2 from the memory 25C and outputting the switch control signal Co and the control signal C1.

The A/D converter 25A is supplied with the sensor signals 8, e.g., a temperature signal, a gas signal, an acceleration (G) signal, etc., from the sensor assembly 8A, the current detected signal 8b from the current sensor 8B, the voltage detected signal 24a from the voltage detector 24A, the ground-fault detected signal 24b from the ground-fault detector 24B, and the sensor signals 31a, e.g., a vehicle speed signal, a radar signal, etc., from the vehicle sensor assembly 31. The A/D converter 25A converts each of these analog sensor signals into a digital sensor signal So, and supplies the digital sensor signal So to the comparator 25B.

The A/D converter 25A also supplies a display control signal KO1 corresponding to the sensor signal So, to the display driver 27 for displaying a condition corresponding to the sensor signal So on the display unit 33.

The comparator 25B compares the sensor signal So with the preset sensor reference value M1 stored in the memory 25C. If the sensor signal So exceeds the sensor reference value M1 (So>M1), then the comparator 25B supplies a display control signal KO2, corresponding to the compared signal Ho, to the display driver 27 for displaying a condition corresponding to the compared signal Ho on the display unit 33.

The timer gate 25D, which may comprise a timer circuit or the like, compares the continuation time $T_H$ with the timer reference value M2 sorted in the memory 25C. If the compared signal Ho continues for a period of time in excess of the timer reference value M2 ($T_H$>M2), then the timer gate 25D supplies the switch control signal Co to the switch controller 26.

The timer gate 25D also supplies the control signal C1 to the vehicle control ECU 32.

The switch control unit 26 comprises a 12 V-shunt drive control element 26A and a drive-voltage-shunt drive control element 26B, and actuates the switches Swa, Swb based on the switch control signal Co from the detector 25 and the switch control signal 32b from the vehicle control ECU 32.

When the switch control signal Co from the detector 25 is of a high level, the 12 V-shunt drive control element 26A and the drive-voltage-shunt drive control element 26B supply high-level switch drive signals D1, D2 to the respective switches Swa, Swb for thereby turning on respective phototransistors Qa, Qb of the switches Swa, Swb.

When the vehicle control ECU 32 determines that the drive power supply 6A is to be shut off due to a malfunction, for example, of the controller 22, based on the sensor signals 31a from the vehicle sensor assembly 31 and the control signals 23a, C1 which effect mutual monitoring on the vehicle control ECU 32 and the detector 25, the vehicle control ECU 32 outputs the switch control signal 32b. Based on the outputted switch control signal 32b, the 12 V-shunt drive control element 26A and the drive-voltage-shunt drive control element 26B supply switch drive signals D1, D2 to the respective switches Swa, Swb for thereby turning on the switches Swa, Swb.

The 12 V-shunt drive control element 26A and the drive-voltage-shunt drive control element 26B also supply display control signals Dc1, Dc2 corresponding to the switch drive signals D1, D2 to the display driver 27 for supplying the display drive signal 27a to the display unit 33 to display conditions corresponding to the switch drive signals D1, D2.

As described above, the circuit breaker 21 of the circuit breaker device 20 has two shunt coils Sh, S1, the shunt coil Sh being connected to the drive power supply 6a and making up a closed loop through the contact Sa, the switch Swb, and the contact Sb, and the shunt coil S1 being connected to the accessory power supply 30 and making up a closed loop through the contact Sc and the switch Swa. When any of the various sensors including the sensor assembly 8A, the current sensor 8B, the voltage detector 24A, the ground-fault detector 24B, and the vehicle sensor assembly 31 detects a malfunction, the switches Swa, Swb are turned on based on the detected signal from the sensor and supply a current to the shunt coils Sh, S1. The circuit breaker 21 is now actuated to open the contacts Sa–Sc, thereby shutting off the drive power supply 6A to cut off the electric energy supplied to the motor 29.

Furthermore, the control voltage $V_D$ for energizing the controller 22 is supplied from the accessory power supply 30 and the drive power supply 6A by the controller power supply unit 23. Therefore, even if the voltage of the accessory power supply 30 drops below a predetermined voltage as, for example, when the driver forgets to turn off lamps on the electric vehicle 11, the controller 22 can be continuously energized by the drive power supply 6A for monitoring the conditions of the electric vehicle 11 based on sensor signals from the sensors and actuating the circuit breaker 21 to turn off the drive power supply 6A in the event of any malfunction detected.

The battery box device 1 according to the present invention has been described with respect to a four-wheel electric vehicle. However, the principles of the present invention are also applicable to a battery box device for use on a two-or three-wheeled electrically driven vehicle.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed:

1. A battery box device for use on an electric vehicle, comprising:
   a drive power supply having a plurality of storage batteries for supplying an electric energy for at least one external load outside said battery box device to drive the electric vehicle;
   a circuit breaker device having control means for producing a power supply control signal based on a condition of the electric vehicle and having a circuit breaker for turning off said drive power supply for said at least one external load in response to the control signal from said control means; and
   a battery box housing at least said storage batteries and being mounted on the electric vehicle, said circuit breaker device being directly mounted on said battery box and operable from outside of said battery box for independently turning off said drive power supply.

2. A battery box device according to claim 1, wherein said control means includes a power supply converting means for reducing the voltage of the electric energy supplied by said storage batteries for use in operating auxiliary external loads outside said battery box device.

3. A battery box device according to claim 1, further comprising a breaker box housing at least said control means and said circuit breaker, said storage batteries and said circuit breaker device being separable from each other and supported by said battery box.

4. A battery box device according to claim 1, wherein said circuit breaker device further includes an accessible control means operable from outside of said battery box, said accessible control member being disposed outside of said battery box.

5. A battery box device according to claim 4, wherein said accessible control means includes a manual breaker switch operable from outside of said battery box for selectively connecting and disconnecting said drive power supply.

6. A battery box device according to claim 4, wherein said circuit breaker device further includes an input connector connected to said drive power supply, said accessible control means including an output connector connectable to an external load, said input connector being disposed in said battery box, said output connector being disposed outside of said battery box for electric connection to the external load.

7. A battery box device according to claim 4, wherein said accessible control means further includes an interface connector for exchanging signals therethrough between the battery box device and a vehicle control unit on the electric vehicle, said interface connector being disposed outside of said battery box for electric connection to the control unit on the electric vehicle.

8. A battery box device according to claim 4, wherein when the battery box device is installed on the electric vehicle, at least said accessible control means is exposed in a passenger's compartment of the electric vehicle for being operated in the passenger's compartment.

9. A battery box device according to claim 8, further comprising sealing means for sealing said accessible control means within the passenger's compartment from exposure to outside of the electric vehicle when the battery box device is installed on the electric vehicle.

10. A battery box device according to claim 8, further comprising sealing means for sealing said accessible control means so as to seal said at least one of said breaker switch, said output connector, and said interface connector within the passenger's compartment from exposure to outside of the electric vehicle when the battery box device is installed on the electric vehicle.

11. A battery box device according to claim 4, wherein said accessible control means includes a manual breaker switch for selectively connecting and disconnecting said drive power supply, an output connector connectable to an external load, and an interface connector for exchanging signals therethrough between the battery box device and a vehicle control unit on the electric vehicle, and wherein when the battery box device is installed on the electric vehicle, at least one of said breaker switch, said output connector, and said interface connector is exposed in a passenger's compartment of the electric vehicle for being operated in the passenger's compartment.

12. A battery box device according to claim 10 wherein said battery box has a window defined in an upper surface thereof for said accessible control means to project out of said window.

13. A battery box device according to claim 10, wherein said battery box has a window defined in an upper surface thereof, said at least one of said breaker switch, said output connector, and said interface connector projecting out of said window.

14. A battery box device according to claim 13, wherein said electric vehicle has a vehicle body including a bottom panel with an opening defined therein, said battery box being mounted on said bottom panel from outside of the electric vehicle with said upper surface of the battery box adjacent said bottom panel and with said opening and said window being held in alignment with each other.

15. A battery box device according to claim 14, wherein said battery box has an upwardly projecting mount with said window defined therein, said circuit breaker device being partly housed in said mount.

16. A battery box device according to claim 15, wherein said circuit breaker device further includes an input connector connected to said drive power supply, output cables connected to said output connector for supplying an electric energy to the external load, said input connector being disposed in said battery box, said output connector being disposed outside of said battery box through said window, said output cables being bent downwardly from said output connector toward said bottom panel of the vehicle body.

17. A battery box device according to claim 15, wherein said circuit breaker device further includes an input connector connected to said output connector for interconnecting said drive power supply and said output connector, said accessible control means including output cables connected to said output connector for supplying an electric energy to said external load, said input connector being disposed outside of said battery box through said window, said output cables being bent downwardly from said output connector toward said bottom panel of the vehicle body.

18. A battery box device according to claim 15, wherein said bottom panel of the vehicle body has an upwardly projecting base, said upwardly projecting mount of the battery box being complementarily housed in said upwardly projecting base, said at least one of said breaker switch, said output connector, and said interface connector being disposed out of said battery box through said window and located in a position higher than said bottom panel.

19. A battery box device according to claim 18, further including sealing means interposed between said upper surface of the battery box and said bottom panel for sealing said at least one of said breaker switch, said output connector, and said interface connector from outside of the electric vehicle.

20. A battery box device according to claim 19, wherein said sealing means is positioned between upwardly located surfaces of said upwardly projecting base and said upwardly projecting mount.

21. A battery box device according to claim 1 wherein sensor means are provided and connected to said circuit breaker device for sensing a said condition and providing a signal to said circuit breaker device representative of at least one of said condition of temperature of said storage batteries, voltage of said storage batteries, ground fault, presence of hydrogen gas in the battery box, and electric current supplied from storage batteries.

22. A battery box device according to claim 21, wherein said sensor means are provided for sensing all of said conditions recited in claim 21 and said control means produces said power control signals responsive to all of said recited conditions.

23. A battery box device for use on an electric vehicle comprising:
- a drive power supply having a plurality of storage batteries for supplying an electric energy for at least one external load outside said battery box device to drive the electric vehicle;
- a circuit breaker device having control means for producing a power supply control signal based on a condition of the electric vehicle and having a circuit breaker for turning off said drive power supply in response to the control signal from said control means; and
- a battery box housing at least said storage batteries and being mounted on the electric vehicle, said circuit breaker device being directly mounted on said battery box and operable from outside of said battery box for independently tuning off said drive power supply;
- wherein said circuit breaker device includes an input connector connected to said drive power supply, an output connector connectable to said at least one external load, said input connector being disposed in said battery box and said output connector being disposed outside of said battery box for electric connection to said at least one external load.

24. A battery box device according to claim 23, wherein said circuit breaker device includes an interface connector for exchanging signals therethrough between the battery box device and a vehicle control unit on the electric vehicle, said interface connector being disposed outside of said battery box for electric connection to the control unit on the electric vehicle.

25. A battery box device according to claim 23, wherein when the battery box device is installed on the electric vehicle, a manually operable circuit breaker switch of said circuit breaker device is exposed in a passenger's compartment of the electric vehicle for being operated in the passenger's compartment.

26. A battery box device according to claim 23, wherein said circuit breaker device includes a manual breaker switch for selectively connecting and disconnecting said drive power supply and an interface connector for exchanging signals therethrough between the battery box device and a vehicle control unit on the electric vehicle, and wherein when the battery box device is installed on the electric vehicle, at least one of said breaker switch, said output connector, and said interface connector is exposed in a passenger's compartment of the electric vehicle for being operated in the passenger's compartment.

27. A battery box device according to claim 26, further comprising sealing means for sealing said at least one of said breaker switch, said output connector, and said interface connector within the passenger's compartment from exposure to outside of the electric vehicle when the battery box device is installed on the electric vehicle.

28. A battery box device according to claim 26, wherein said battery box has a window defined in an upper surface thereof, said at least one of said breaker switch, said output connector, and said interface connector projecting out of said window.

29. A battery box device according to claim 28, wherein said electric vehicle has a vehicle body including a bottom panel with an opening defined therein, said battery box being mounted on said bottom panel from outside of the electric vehicle with said upper surface of the battery box adjacent said bottom panel and with said opening and said window being held in alignment with each other.

30. A battery box device according to claim 29, wherein said battery box has an upwardly projecting mount with said window defined therein, said circuit breaker device being partly housed in said mount.

31. A battery box device according to claim 30, wherein said bottom panel of the vehicle body has an upwardly projecting base, said upwardly projecting mount of the battery box being complementarily housed in said upwardly projecting base, said at least one of said breaker switch, said output connector, and said interface connector being disposed out of said battery box through said window and located in a position higher than said bottom panel.

32. A battery box device according to claim 31, further including sealing means interposed between said upper surface of the battery box and said bottom panel for sealing said at least one of said breaker switch, said output connector, and said interface connector from outside of the electric vehicle.

33. A battery box device for use on an electric vehicle, comprising:
- a drive power supply having a plurality of storage batteries for supplying an electric energy for at least one external load outside the battery box device to drive the electric vehicle;
- a circuit breaker device having control means for producing a power supply control signal based on a condition of the electric vehicle and having a circuit breaker for turning off said drive power supply in response to the control signal from said control means; and
- a battery box housing at least said storage batteries and being mounted on the electric vehicle, said circuit breaker device being mounted directly on said battery box operable from outside of said battery box for independently turning off said drive power supply;
- wherein said battery box has a window defined in an upper surface thereof, at least a portion of said breaker switch device projecting out of said window for permitting access to said portion of said circuit breaker device from outside the battery box.

34. A battery box device according to claim 33, wherein said electric vehicle has a vehicle body including a bottom panel with an opening defined therein, said battery box being mounted on said bottom panel from outside of the electric vehicle with said upper surface of the battery box adjacent said bottom panel and with said opening and said window being held in alignment with each other.

35. A battery box device according to claim 34, wherein said battery box has an upwardly projecting mount with said window defined therein, said circuit breaker device being partly housed in said mount.

36. A battery box device according to claim 35, wherein said bottom panel of the vehicle body has an upwardly projecting base, said upwardly projecting mount of the battery box being complementarily housed in said upwardly projecting base, at least a portion of said breaker switch device being disposed out of said battery box through said window and located in a position higher than said bottom panel.

37. A battery box device according to claim 36, further comprising sealing means interposed between said upper surface of the battery box and said bottom panel for sealing said breaker switch device from outside of the electric vehicle.

* * * * *